US012597831B2

(12) United States Patent (10) Patent No.: US 12,597,831 B2
Oechslen et al. (45) **Date of Patent: \*Apr. 7, 2026**

(54) COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 289 days.

This patent is subject to a terminal disclaimer.

(21) Appl. No.: 18/474,249

(22) Filed: Sep. 26, 2023

(65) Prior Publication Data

US 2024/0120808 A1 Apr. 11, 2024

(30) Foreign Application Priority Data

Oct. 5, 2022 (DE) ..................... 10 2022 125 586.7

(51) Int. Cl.
*H02K 9/193* (2006.01)
*B60K 1/00* (2006.01)
*H02K 11/33* (2016.01)

(52) U.S. Cl.
CPC .............. *H02K 9/193* (2013.01); *B60K 1/00* (2013.01); *H02K 11/33* (2016.01); *B60K 2001/006* (2013.01)

(58) Field of Classification Search
CPC .......... H02K 9/193; H02K 11/33; B60K 1/00; B60K 2001/006
See application file for complete search history.

(56) References Cited

U.S. PATENT DOCUMENTS 8,080,909 B2 12/2011 Perkins
2019/0070951 A1* 3/2019 Lucke ................. H01M 10/625
(Continued)

FOREIGN PATENT DOCUMENTS

CN 110281763 A 9/2019
CN 111959252 A 11/2020
(Continued)

*Primary Examiner* — Edwin A Young
(74) *Attorney, Agent, or Firm* — LEYDIG, VOIT & MAYER, LTD.

(57) ABSTRACT

A cooling system for an electric traction machine for a motor vehicle, including a circuit system for conducting a first coolant to be circulated, a first circulation pump for conveying the first coolant in the circuit system, an AC housing for an AC connection for the electric traction machine, and a motor inlet connection for fluidly connecting the circuit system on the input side to the electric traction machine to be temperature-controlled. The cooling system further includes a motor outlet connection for fluidly connecting the circuit system on the output side to the electric traction machine to be temperature-controlled, a first heat exchanger for dissipating heat from and/or supplying heat to the first coolant to be circulated in the circuit system, and a first main line, by which the first heat exchanger and the AC housing are fluidly connected to one another.

19 Claims, 2 Drawing Sheets

(56)         References Cited

U.S. PATENT DOCUMENTS

2023/0083635 A1      3/2023  Henkel et al.
2023/0392543 A1*  12/2023  Colavincenzo ........... B60L 1/02
2024/0120806 A1*    4/2024  Oechslen ............... B60K 11/02

FOREIGN PATENT DOCUMENTS

CN        214564592  U     11/2021
DE      102013204766  A1      9/2014
DE      102019210029  A1      1/2021
DE      102020202203  A1      8/2021
JP         2014007884  A      1/2014
JP         2019147425  A      9/2019
WO        2021195862  A1     10/2021

* cited by examiner

COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 125 586.7, filed on Oct. 5, 2022, which is hereby incorporated by reference herein.

FIELD

The invention relates to a cooling system for an electric traction machine for a motor vehicle, a thermal management module having such a cooling system for a powertrain of a motor vehicle, a powertrain having such a thermal management module for a motor vehicle, and a motor vehicle having such a powertrain.

BACKGROUND

From the prior art, cooling systems for electric traction machines are known for dissipating the resulting waste heat in case of a power demand. For increased cooling capacity, the idea is to directly perfuse at least the stator of an electric traction machine with a coolant, wherein the coolant is to be configured as a dielectric coolant. It is sensible to cool as few components as possible in this dielectric cooling system. Other components of a powertrain in which such an electric traction machine is integrated, such as a transmission and a pulse inverter, are preferably cooled in at least one separate cooling circuit. For example, a transmission is cooled by means of an oil circuit such that the coolant (transmission oil) is simultaneously set up so as to lubricate the transmission components. For example, a pulse inverter is arranged in a water circuit, with which further vehicle components are preferably coolable.

If a traction machine is cooled directly, as mentioned, it is necessary for the coolant (dielectric material) to be as good an electric insulator as possible. If there are air inclusions, this electrically insulating property and also the thermal capacity decreases. It is therefore desirable that, as far as possible, no air is found in the conduit system and, above all, does not remain there.

SUMMARY

In an embodiment, the present disclosure provides a cooling system for an electric traction machine for a motor vehicle, comprising a circuit system for conducting a first coolant to be circulated, a first circulation pump for conveying the first coolant in the circuit system, an AC housing for an AC connection for the electric traction machine, and a motor inlet connection for fluidly connecting the circuit system on the input side to the electric traction machine to be temperature-controlled. The cooling system further comprises a motor outlet connection for fluidly connecting the circuit system on the output side to the electric traction machine to be temperature-controlled, a first heat exchanger for dissipating heat from and/or supplying heat to the first coolant to be circulated in the circuit system, and a first main line, by which the first heat exchanger and the AC housing are fluidly connected to one another.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
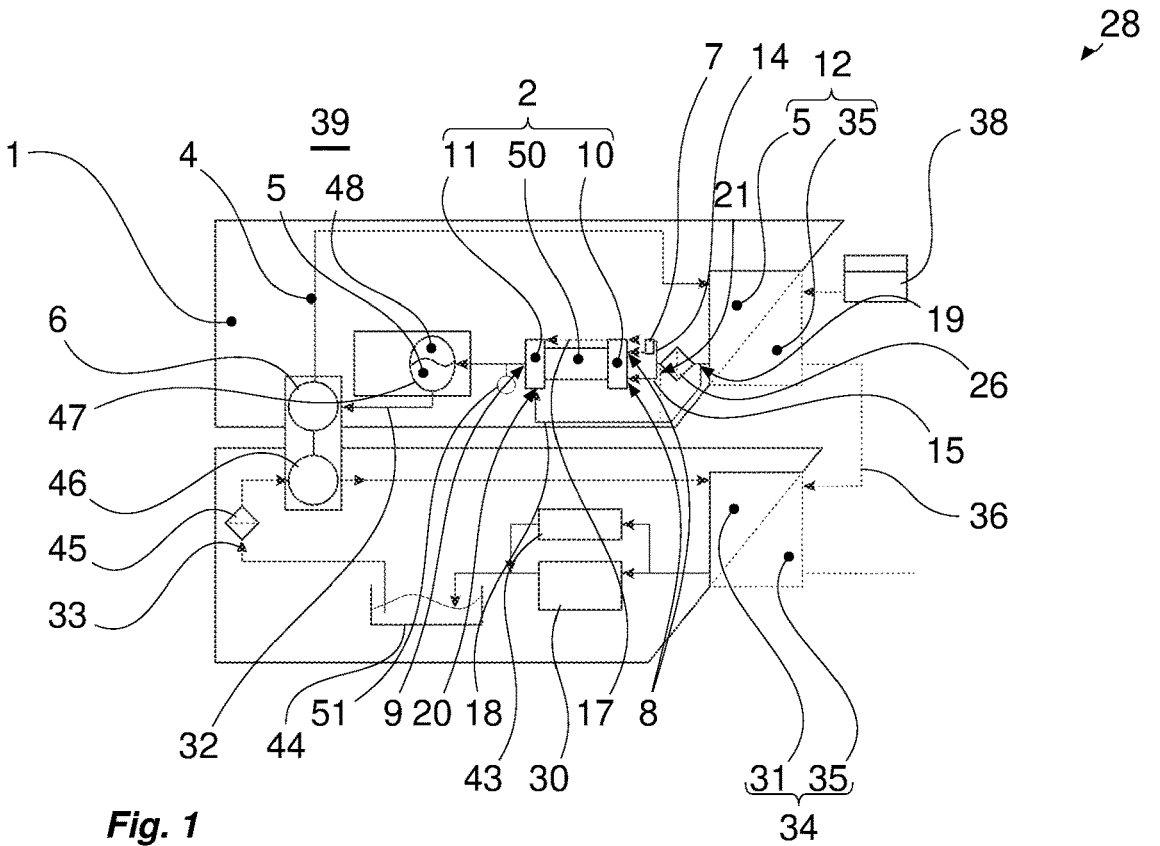
FIG. 1 illustrates a thermal management module in a schematic diagram.

In an embodiment the present invention at least partially overcomes the disadvantages known from the prior art. The features of the present disclosure can be combined in any technically meaningful manner, wherein the explanations from the following description as well as features from the figures, which comprise supplementary embodiments of the invention, can also be used for this purpose.

In an embodiment, the invention relates to a cooling system for an electric traction machine for a motor vehicle, comprising at least the following components:

a circuit system for conducting a first coolant to be circulated;

a first circulation pump for conveying the first coolant in the circuit system;

an AC housing for an AC connection for an electric traction machine;

a motor inlet connection for fluidly connecting the circuit system on the input side to an electric traction machine to be temperature-controlled;

a motor outlet connection for fluidly connecting the circuit system on the output side to the electric traction machine to be temperature-controlled; and a first heat exchanger for dissipating heat from and/or supplying heat to the first coolant that is being circulated in the circuit system.

The cooling system is characterized in particular in that a first main line is provided, by means of which the first heat exchanger and the AC housing are fluidly connected to one another.

Reference will hereinafter be made to the specified respective direction of circulation or direction of conveyance, where in front of, behind and corresponding terms are used without explicit other indication. Ordinal numbers used in the description above and below are used only for clear differentiation and do not reflect any order or ranking of the designated components, unless explicitly indicated otherwise. An ordinal number greater than one does not necessitate that a further such component must necessarily be present.

In advance, it should be noted that, with the cooling system provided here, waste heat must primarily be dissipated, but an increase in the temperature of components temperature-controlled by the cooling system is also a possible operating condition, for example in winter temperatures, so that the components are brought quickly to operating temperature. In most applications, however, waste heat is also to be dissipated in winter temperatures in the operation of an electric traction machine of a motor vehicle, i.e., cooling is the goal. It should also be noted that the cooling system provided here is not limited to the use of a dielectric coolant, and is also operable, for example, by using temperature control with water and/or oil as the coolant. Then, an insulator, for example a casing, is preferably provided between the current-conducting components of the traction machine to be temperature-controlled and the (electrically conductive or not sufficiently electrically insulating) cool- ant.

It should further be noted that, for clarity in terms of components and properties to be described later, compo- nents or properties of the cooling system having the same name are respectively designated as first components or properties, wherein this is not always done in a clear context.

The cooling system comprises a circuit system which includes a plurality of lines and/or line sections between or in those components which can be temperature controlled by means of the cooling system. Within the circuit system, the first coolant is almost completely or partially encapsulated from an environment and therefore a loss of gaseous com- ponents occurs in negligible amounts at most (for example as a result of leaks) there. Nevertheless, gas (primarily air from the environment) enters through leaks, or gas pockets are present in the circuit system as a result of assembly or maintenance work.

A (first) circulation pump is provided for circulating the first coolant. A pressure gradient is generated by the circu- lation pump, resulting in a (first) circulation direction in the circuit system. In an embodiment, the circulation pump is operable for two circulation directions, but the first circula- tion direction is the main direction of operation, at least when dissipating waste heat from the integrated electric traction machine. A reversal of the direction is adjustable, for example, by reversing the direction of rotation of a pump wheel, but preferably by way of a corresponding way-valve.

In an embodiment, a compensation tank is provided and set up for equalizing the pressure between the circuit system and an environment, wherein gas inclusions in the first coolant can be separated here significantly as a result of a pressure drop (which may be e.g., open to the environment).

An electric traction machine is integrated into the cooling system for temperature control in that it is supplied with the first coolant via a motor inlet connection, wherein the first coolant introduced is discharged from the electric traction machine again via a motor outlet connection. The motor inlet connection is connected (preferably in the region of at least one of the two winding heads, i.e., the winding head region, for example enclosed by a housing) to the electric traction machine and the motor outlet connection is con- nected at the end that is axially opposite to the motor (with respect to the axis of rotation of the rotor shaft of the electric traction machine) (in the region of one, preferably others, of the two winding heads). It should be noted that when the (first) circulation direction is reversed, an outlet is formed from the motor inlet connection and an inlet is formed from the motor outlet connection. Preferably, however, the direc- tion of flow via the electric traction machine remains the same; that is, the motor inlet connection is an inlet and the motor outlet connection is an outlet for the first coolant, wherein this is achieved, for example, by means of appro- priate line routing and/or at least one switchable directional control valve.

The (first) heat exchanger is configured so as to transfer heat between two fluids, i.e., the first coolant and a further fluid (for example water or ambient air). In an embodiment for air cooling, for example, a fan is included.

An AC housing is furthermore provided in order to supply the electric traction machine, which houses an AC connec- tion. By means of the AC connection, the traction machine (preferably controlled via external power electronics, for example comprising or formed by a pulse AC converter) is supplied with a power current or a power voltage. Here as well, there is a narrow optimal range for an operating temperature, so that it is desirable to temperature-control the AC housing or the AC connection that is located in it. Here, it is provided to perform the temperature control using the cooling system, i.e., the first coolant that is used to temper the traction machine. For this purpose, a first main line is provided, which is fluidly connected by means of its (first) inlet (directly or indirectly) to the first heat exchanger and by means of its outlet (directly or indirectly) to the AC housing, wherein the inlet and outlet in each case are separate connection elements, or being formed by the respective component (for example in one piece).

In an advantageous embodiment, the first coolant is a dielectric coolant for direct contact with the electrically conductive and peripheral components (for example, AC power buses) of the traction machine to be temperature- controlled. A direct cooling is therefore a flow that directly contacts components of a unit to be temperature-controlled; for example, as a substitute for a lubricant or, as here in a traction machine, preferably (among other things) as a substitute for the insulation material between the stator winding and the stator lamination pack.

It is further provided, in an advantageous embodiment of the cooling system, that the first main line is connected to the AC housing at the highest point in a normal orientation of the AC housing in the earth gravity field, wherein preferably the highest point of the AC housing in the normal orientation is the same as or higher than at least one of the following components:

the motor inlet connection;

the motor outlet connection; and a different line section of the circuit system.

In an application of the cooling system in a thermal management module, there is a fixed alignment in the earth gravity field for assembly reasons. In a dynamic application, for example in an automotive vehicle, deviations from this fixed orientation are possible in operation, or there is a regular angular range in which a point forms the highest point, but also a different angular range (for example, when accelerating or decelerating), in which other points form the highest point in the earth gravity field. The deviating angular range occurs preferably sufficiently rarely and/or for a sufficiently short time. When a "highest point" is hereinafter referred to, this means a point by which the highest point of the respective component is formed in an application at least while idling, preferably also in a regular angular range. It should also be noted that the respective highest point in an application may not be the absolute highest point of a component, but rather a locally highest point (i.e., a local and not global maximum of the height) and/or that a technical deviation is also permitted with a highest point, for example, having a real highest point due to a manufacturing tolerance and/or due to a limited manufacturability, wherein the remaining volume (for tolerance-related or manufactur- ing-related reasons) is preferably negligible for the technical application.

It is now provided that the first main line (preferably directly by means of its output) is connected to the AC housing at the highest point of the AC housing. In an embodiment, the first main line is connected to the AC housing just below this highest point, for example less than 2 cm [two centimeters], preferably less than 5 mm [five millimeters]). In an embodiment, the first main line is directly connected to the highest point of the AC housing. In a preferred embodiment, the output of the first main line is also the highest point of the first main line.

In an advantageous embodiment, the highest point of the AC housing is equal to or higher than the motor inlet connection, the motor outlet connection, and/or another line section of the circuit system (preferably only by a little, for example less than 1 cm [one centimeter], preferably no more than 2 mm [two millimeters]). Thus, an air inclusion with the cooling liquid can be carried along when circulating in (at least the first) circulation direction and thus can easily be discharged from the AC housing, i.e., in normal operation (preferably with a low or average operating pressure gradient).

Preferably, with a normal alignment of the AC housing (and the entire cooling system) between the highest (first) point of the AC housing, the highest (second) point of the first winding head region, and the highest (third) point of the second winding head region, there is no height difference, or a negligible height difference, or a lower height difference (as indicated above, for example). Thus, an air inclusion with the cooling liquid can be carried along when circulating in the (first) circulation direction and thus easily (preferably from the entire cooling system) out of the aforementioned components, i.e., in normal operation (preferably with a low or average operating pressure gradient), conveyed without undercuts up to an (optional) compensation tank, and there, such a gas can be discharged. Particularly preferably, in the normal orientation, no line section of the cooling system is provided which has a higher point than the specified points, wherein, preferably even until an (optional) expansion container has been reached, a respective highest line section is arranged not lower than, negligibly not as low as, or not as low as the specified points at the same time.

In an advantageous embodiment of the cooling system, it is furthermore provided that the first main line be arranged upstream of a filter arranged behind the first heat exchanger.

Here, it is provided that, by means of a filter, the AC housing or an AC connection arranged therein is protected against particles and/or large gas bubbles by retaining these in the filter or reducing them in size. In an application, it is possible that metallic particles are conveyed in the cooling system or its circuit system by a machined component or as a result of careless assembly. These are electrical conductors and can also mechanically damage the components (for example, abrasively or in an impacting manner) or in large quantities can also lead to clogging of thin line sections. By means of the filter, this is largely prevented. Alternatively or additionally, such a filter is not provided or is arranged downstream of the AC housing.

It is further provided in an advantageous embodiment of the cooling system that a first vent line is provided between the AC housing and one, preferably the first, of the winding head regions of the electric traction machine to be temperature-controlled, wherein the first vent line is preferably indirectly or directly fluidly connected to at least one of the following highest points in the earth gravity field in a normal orientation of the cooling system:

with the highest point of the AC housing;

with the highest point of a first winding head region of the electric traction machine to be temperature-controlled; and with the highest point of a second winding head region of the electric traction machine to be temperature-controlled.

At the heat exchanger, a (first) input is provided and at the AC housing an output is provided, wherein the input and output are separate connection elements or are formed by the component in question (for example, integrally).

By means of the (first) vent line, gas enclosed in the AC housing is easily conveyable by means of the (first) cooling liquid to one of the winding head regions, preferably the first winding head region for reasons of relative spatial arrangement. Here, too, the gradient or the increase (in the first circulation direction) of the first vent line is preferably low, i.e., between the AC housing and the respective winding head region, preferably both winding head regions, as well as a second vent line, for example, as described below.

As already described above, a height difference between the highest points is preferably low. Independently thereof, a separate line section for discharging gas inclusions is preferably provided by means of the first vent line, which also fluidly connects the respective highest points of the AC housing and the first winding head region and/or (if necessary indirectly via a further, for example the aforementioned second, vent line) the second winding head region. In this respect, the aforementioned low height differences are preferably present, or else none are present.

It is further provided in an advantageous embodiment of the cooling system that a second vent line is provided, by means of which, in a normal orientation of the electrical traction machine in the earth gravity field, the respective highest points of winding head regions of the electrical traction machine to be temperature-controlled are fluidly connected to one another.

For example, two highest points are equal in height or different in height (preferably only by a little, for example less than 1 cm [one centimeter], preferably not more than 2 mm [two millimeters]). Thus, an air inclusion with the cooling liquid can be carried along when circulating in (at least the first) circulation direction and thus can easily be discharged from the respective component, i.e., in normal operation (preferably with a low or average operating pressure gradient).

It is now provided that a second vent line is provided. It should be noted that the description as a second vent line does not necessarily mean that a first vent line is provided.

The (second) vent line is arranged so that the winding head regions are fluidly connected to one another at their respective highest points, i.e., a gas or a gas bubble is carried along from one of the winding head regions to the other winding head region with the cooling liquid in the (respectively given) circulation direction, and preferably conveyed to a compensation tank and deposited therein. Preferably, this second vent line is provided separately from passages for temperature-controlling the electrical traction machine, so that a maximum temperature-controlling power, a low counter-pressure, and a good electrical insulation is ensured there, because gas inclusions are likely to be guided exclusively via the second vent line.

According to a further aspect, a thermal management module for a powertrain of a motor vehicle is provided, comprising at least the following components:

for a transmission, an oil circuit having a second circulation direction and having a second heat exchanger;

for at least one vehicle component, a water circuit having a third circulation direction and having a third heat exchanger; and for an electric traction machine, a cooling system according to one embodiment according to the above description, wherein, preferably, a pulse inverter for the electric traction machine is arranged in the water circuit.

Here, the cooling system described above is integrated into a thermal management module for a powertrain of a motor vehicle, wherein this thermal management module [TMM] is well known for its functions and tasks. In addition to components of a powertrain, other vehicle components are preferably also temperature-controlled, for example a (preferably traction) battery.

Other components of a powertrain in which such an electric traction machine is integrated, such as a transmission and a pulse inverter, are preferably cooled in at least one cooling circuit that is separate from the cooling system. For example, a transmission comprising a (preferably switchable) gearbox and/or a differential is cooled by way of an oil circuit with an oil, preferably directly. A direct cooling is a flow that directly contacts components of the transmission (for example gears), for example as a substitute for a lubricant. For example, the oil circuit is conventional. In an advantageous embodiment, a second circulation pump for generating a second circulation direction in the oil circuit is coupled to the first circulation pump for generating the first circulation direction in the circuit system for the first coolant as a so-called tandem pump, such that a single drive is sufficient for both circulation pumps. The waste heat is thereby released via the second heat exchanger.

Vehicle components to be temperature-controlled, which are not arranged in the oil circuit or the cooling system, are preferably temperature-controlled by means of a water circuit. The water is often a water-glycol mixture. The water of the water circuit is conveyed (by means of a third circulation pump) in a third circulation direction via a third heat exchanger. The third heat exchanger is preferably configured for heat transfer with the environment or the ambient air, wherein a fan is preferably provided for a (forced) convection on the third heat exchanger.

It should be noted that the respective components are also heatable in the oil circuit and/or the water circuit, for example in winter temperatures, wherein, however, the main state here is also the dissipation of waste heat. The respective circulation direction is also reversible, where appropriate.

In an advantageous embodiment, a pulse inverter [PWR] for an electric traction machine to be temperature-controlled by the cooling system with the first coolant is arranged in the water circuit for temperature control, i.e., not a component to be temperature-controlled in the cooling system with the first coolant. It is advantageous to keep the number of components in said cooling system for an electric traction machine low. With a pulse inverter, the use of a dielectric (first) coolant is not necessary. It is therefore advantageous to arrange the pulse inverter outside of said cooling system.

It is further provided in an advantageous embodiment of the thermal management module that the water circuit is connected to the first heat exchanger of the cooling system for an electric traction machine for heat transfer, preferably as the only liquid-bound heat transfer means of the cooling system to the environment, wherein, preferably in the third circulation direction of the water circuit, a pulse inverter for an electric traction machine is arranged upstream of the first heat exchanger.

It is provided here that the cooling system be heat-coupled to the first coolant and the water circuit, i.e., the water circuit is configured by means of the (first) heat exchanger for temperature control of the first coolant. Thus, in the first heat exchanger, for example upon cooling of the electric traction machine (technically without liquid exchange), the heat is released from the first coolant to the water in the water circuit.

In a preferred embodiment, no further (forced) convection is provided for temperature control of the electric traction machine (and preferably also not further components in the cooling system) and for dissipating heat from the first coolant. Rather, the first heat exchanger is then the only unit of the cooling system for transferring heat, namely with the water circuit.

In a preferred embodiment, the pulse inverter is arranged in the (third) circulation direction of the water circuit upstream of the first heat exchanger so that the temperature gradient above the pulse inverter is as large as possible, while the temperature gradient above the first heat exchanger (due to the mostly very large heat output of the electric traction machine) is still sufficient.

In an advantageous embodiment, a reversing valve is provided for reversing the (first) circulation direction. In an embodiment, the first coolant then passes through a separate return channel. Preferably, the same conduit is used for both directions.

Thus, in the main direction, the order of the components is (beginning with the first circulation pump):

1. the first circulation pump;
2. the first heat exchanger;
3. the electric traction machine; and
4. the compensation tank.

In this case, within the main direction, the bypass section according to the above description is preferably arranged in such a manner that it connects a line section of the circuit system from the first circulating pump to a line section upstream of the compensation tank. And, in the secondary direction, the order of the components is:

1'. the first circulation pump;
2'. the compensation tank;
3'. the first heat exchanger; and
4'. the electric traction machine.

It should be noted that flow also passes through possible further components in the cooling system in reverse order, or flows through only some or exclusively the mentioned three components in reverse order.

It is furthermore provided in an advantageous embodiment of the thermal management module that the water circuit is also connected to the second heat exchanger of the oil circuit for heat transfer, preferably as the only liquid-borne heat transfer of the cooling system to the environment, wherein, preferably in the third circulation direction of the water circuit, the first heat exchanger is arranged upstream of the second heat exchanger.

It is provided here that the oil circuit and the water circuit be heat-coupled to one another, i.e., the water circuit is configured by means of the (second) heat exchanger for temperature control of the oil. In the second heat exchanger, for example, when the transmission cools (technically without liquid exchange), the heat from the oil in the oil circulation is released to the water in the water circuit.

In a preferred embodiment, no further (forced) convection is provided for temperature control of the transmission (and preferably also not for further components in the oil circuit) and for dissipating heat from the oil. Rather, the second heat exchanger is then the only unit of the oil circuit for heat transfer, namely with the water circuit.

In a preferred embodiment, the first heat exchanger is arranged in the (third) circulation direction of the water circuit upstream of the second heat exchanger so that the temperature gradient above the first heat exchanger is as large as possible, while the temperature gradient above the second heat exchanger (due to the mostly higher permissible temperature level in a transmission in comparison to an electric traction machine) is still sufficient.

According to a further aspect, a powertrain for a motor vehicle is provided, comprising at least the following components:

at least one electric traction machine to provide a torque;

at least one propulsion wheel for propelling the relevant motor vehicle by means of a torque of the electric traction machine;

at least one transmission for conducting a torque between the electric traction machine and at least one of the propulsion wheels; and a cooling system according to one embodiment as per the above description for at least one of the electric traction machines and/or a thermal management module according to one embodiment according to the above description for at least one of the electric traction machines, at least one of the transmissions and at least one vehicle component, and preferably a pulse inverter for at least one of the electric traction machines.

A powertrain is now provided here, which comprises at least one electric traction machine by means of which torque is generated. The torque of the respective electric traction machine is transferable via a transmission to at least one propulsion wheel. The at least one propulsion wheel is configured so as to drive the motor vehicle forward. The temperature control of the components of the powertrain is performed by a cooling system or a thermal management module comprising a cooling system according to one embodiment according to the above description. For the third heat exchanger, the air of the environment is preferably used, namely passively by means of driving wind and/or actively by means of a fan.

In a further aspect, a motor vehicle is provided, comprising a chassis having a transport compartment and a powertrain according to an embodiment according to the description above for driving the automotive vehicle forward.

The motor vehicle is provided for transporting at least one passenger and/or goods and comprises a passenger compartment and/or a cargo compartment. The motor vehicle is driven via the at least one propulsion wheel by means of the torque of at least one of the electric traction machines.

Embodiments of the invention described above are explained in detail below with reference to the accompanying drawings, which show preferred configurations, in light of the relevant technical background. Embodiments of the invention are not limited in any way by the schematic drawings, wherein it is noted that the drawings are not true to size and are not suitable for defining proportions.

Figure 2:
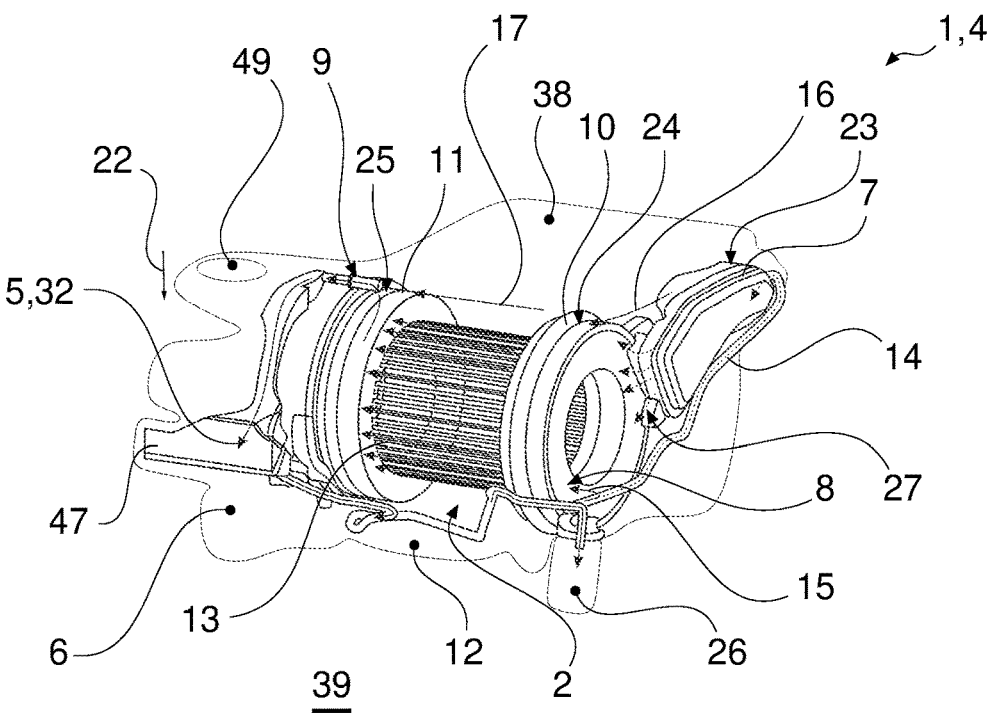
FIG. 2 illustrates a cooling system in a first spatial view.

FIG. 1 shows a thermal management module 28 in a schematic diagram, comprising a cooling system 1 according to FIG. 2 for an electric traction machine 2. A first heat exchanger 12 of the cooling system 1 is set up here for heat transfer with a water circuit 35 (only shown in a section here), so that the first coolant 5 of the circuit system 4 of the cooling system 1 and the water (mixture) of the water circuit 35 are in the heat exchange with one another. A second heat exchanger 34 of an oil circuit 31 for a transmission 30 is also configured here for heat transfer with the water circuit 35 (shown only in a section here), so that the oil of the oil circuit 31 and the water (mixture) of the water circuit 35 are in the heat exchange with one another.

In the water circuit 35, a pulse inverter 38 for the electric traction machine 2 to be temperature-controlled in the cooling system 1 is arranged here, namely in the (third) circulation direction 36 of the water circuit 35 upstream of the first heat exchanger 12 of the cooling system 1 with the (first) coolant 5. In addition, the second heat exchanger 34 is arranged behind the first heat exchanger 12 in the third circulation direction 36.

In the oil circuit 31, in the (second) circulation direction 33, a transmission 30 and a transmission component 43 are arranged behind the second heat exchanger 34, which are connected here in parallel to one another. Subsequently, an oil sump 44, consequently a coarse filter 45 and finally (shown in the illustration) a second circulation pump 46, are arranged in the oil circuit 31. The second circulation pump 46 is here (optionally) embodied as a tandem pump with a first circulation pump 6 of the cooling system 1 having the first coolant 5.

The cooling system 1 comprises a circuit system 4 in which the following components are arranged in the (first) circulation direction 32:

1. the first circulation pump 6;
  2. the first heat exchanger 12;
  3. an optional (oil) filter 26;
  4. the electric traction machine 2, which is perfused via a motor inlet connection 8 and a motor outlet connection 9; and
  5. a compensation tank 47.

The compensation tank 47 is filled partially with the first coolant 5 and partially with a gas 48, so that a pressure increase resulting from a temperature-related increase in volume can be compensated or at least reduced by means of the volume compensation tank 49 and the compressible gas 48 contained therein. Alternatively, the compensation tank 47 is configured for exchanging air from the environment 39. This exchanged air can be completely or partially freed from components of the coolant, humidity or contamination with appropriate filters. It should be noted that, in the shown embodiment of the thermal management module 28, no heat exchanger is provided from the cooling system 1 and the oil circuit 31 for heat transfer to the environment 39. Rather, the first heat exchanger 12 and the second heat exchanger 34 are coupled to the water circuit 35.

Figure 3:
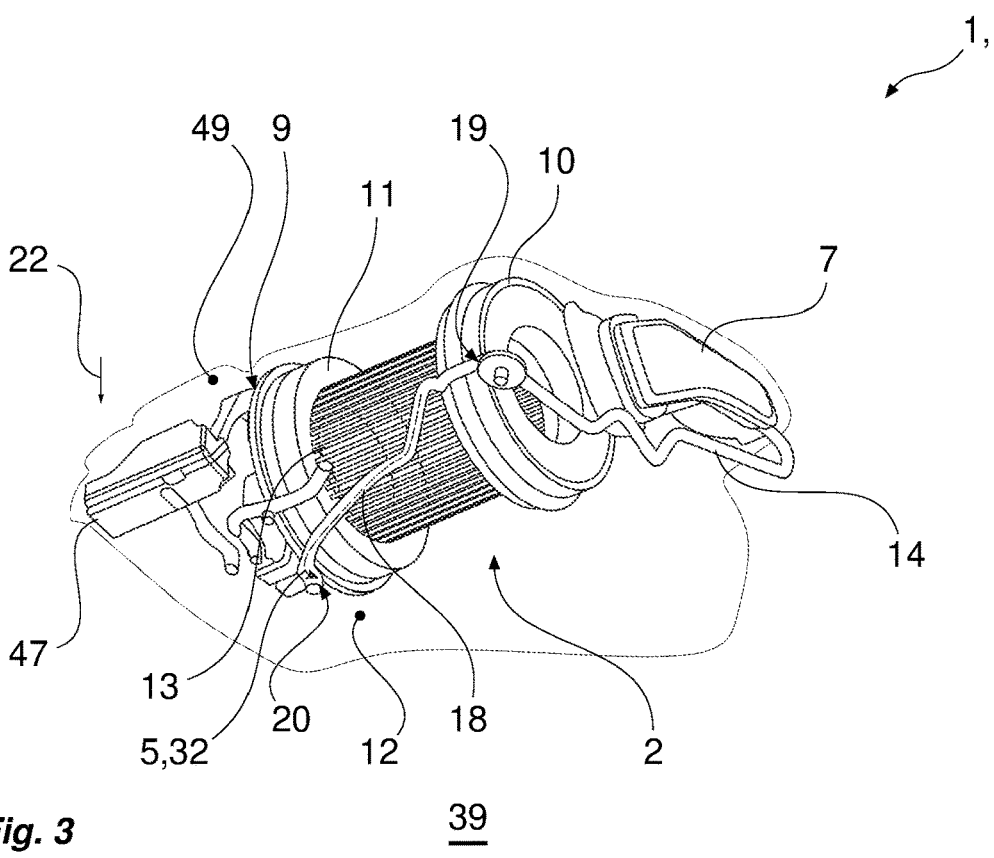
FIG. 3 illustrates the cooling system according to FIG. 2 in a second spatial view.

The electric traction machine 2 is here provided with (optional) vent lines 16, 17, main lines 14, 15 and a bypass line 18. The electric traction machine 2 is detailed here with a first winding head region 10 (shown at the right end) of a stator lamination pack 50 (preferably with cooling grooves 13 as shown in FIG. 2 and FIG. 3) and a second winding head region 11 (shown at the left end), wherein the designation as the first winding head region 10 and second winding head region 11 is selected solely according to the flow sequence in the first circulation direction 32, without consideration of the bypass line 18. Advantageous embodiments of the vent lines 16, 17, the main lines 14, 15 and the bypass line 18 are shown and explained in more detail in the following FIGS. 2 and 3. Optionally, a temperature sensor 51 for sensing the temperature of the first coolant 5 in the circuit system 4 of the cooling system 1 is provided behind the electric traction machine 2.

Directly behind the first heat exchanger 12, a bypass line 18 is branched off via a first connector 19, which is fluidly connected directly via the second connector 20 to the second winding head region 11 of the electric traction machine 2. Here, an optional third connection 21 is shown (dashed), which alternatively or additionally supplies the bypass line 18.

Furthermore, an optional second vent line 17 is shown (dotted) between the two winding head areas 10, 11, which is formed separately from a flow through the stator lamination pack 50. The second vent line 17 is preferably connected to the respective highest point, at least at the first winding head region 10 the highest (second) point 24 (see FIG. 2), wherein the second vent line 17 is preferably arranged in the normal orientation of an application of the thermo-management module 28 in the earth gravity field 22 without raising or lowering with an extent parallel to the earth gravity field 22, i.e., preferably no hydraulic undercuts are formed.

A branching is provided in front of the first winding head region 10 (and optionally behind the (oil) filter 26), wherein a (optional second) main line 15 is directly connected to the first winding head region 10, and a (optional first) main line 14 is routed via an AC housing 7 and only thereafter into the first winding head region 10. It should be noted that in an embodiment, only a first main line 14, i.e., the traction machine 2 is supplied with (the first) coolant 5 solely via the AC housing 7, and in an alternative embodiment, only a second main line 15 according to this designation is provided. In an embodiment with both a first main line 14 and a second main line 15, the first main line 14 is preferably feedable at a higher flow rate than the second main line 15, the (first) flow rate of the first main line 14 preferably being (about) twice as great or more than the (second) flow rate of the second main line 15. In an embodiment, a ratio of the flow rates of the main lines 14, 15 can be changed; for example, at least one of the main lines 14, 15 can be closed, and/or the associated flow rate can be controlled.

FIG. 2 shows a cooling system 1 in a spatial view, wherein the components are shown transparently here (with a dotted line), and the liner of the circuit system 4 is shown with a solid line. Purely functionally, reference is made to the cooling system 1 in the circuit diagram according to FIG. 1, wherein only one possible embodiment of a cooling system 1 according to the circuit diagram described above is shown without exclusion of generalities.

The electric traction machine 2 can be seen at the center or the housing, which comprises cooling for the first winding head region 10 (shown on the right) and for the second winding head region 11, as well as a plurality of cooling grooves 13.

Spatially behind the traction machine 2, there are power electronics comprising at least one pulse inverter 38 and to the left of the traction machine 2, a volume compensation tank 49 (optional) is indicated, wherein the volume compensation tank 49 (for the first coolant 5 as a dead end) being connected to the compensation tank 47. The volume compensation tank 49 is adapted to compensate for volume fluctuations as a result of pressure variations and/or gas inclusions, and is arranged so that it is open or closed to the environment 39.

On the left, a compensation tank 47 is shown as an L-shaped structure in an advantageous embodiment, which is directly connected to the motor outlet connection 9 at the second winding head region 11 and connected to the (first) heat exchanger 12 via a (first) circulation pump 6. The heat exchanger 12, in turn, is fluidly connected to the first winding head region 10 via a (optional) (oil) filter 26 and a second main line 15 which is connected thereafter.

Branching off from the second main line 15 (and thus behind the (oil) filter 26), a first main line 14 can be seen, which is fluidly connected to the AC housing 7 at its (optionally highest) point 23. It should be noted that this does not mean that the first main line 14 is subordinate to the second main line 15 or necessarily has a lower flow rate. Again, the AC housing 7 is fluidly connected to the first winding head region 10 via (here a plurality of) connecting lines 27. However, a separate (first) vent line 16 is also provided here, which is fluidly connected to the highest (first) point 23 of the AC housing 7 and the highest (second) point 24 of the first winding head region 10. As the name says, this is adapted to remove gas entrapments from the AC housing 7. The coolant 5, which is routed via the connecting lines 27, is therefore highly likely to be gas-free or a co-distributed gas quantity is negligible.

A separate second vent line 17 is provided between the first winding head region 10 and the second winding head region 11 in parallel to the cooling grooves 13 by means of which the highest (second) point 24 of the first winding head region 10 and the highest (third) point 25 of the second winding head region 11 are fluidly connected to one another. Preferably, these highest points 23, 24, 25 are all arranged at the same level when the cooling system 1 is in a normal orientation in the earth gravity field 22. Preferably, the cooling grooves 13 are in direct contact with the stator lamination pack 50 and/or the stator winding, for example by being provided as recesses, preferably directly in the grooves for a stator winding. In an embodiment, the cooling grooves 13 are formed in the intermediate space in the stator grooves and the winding; for example, embodied as so-called hair pins (and optionally insulation paper in the stator grooves).

In FIG. 3, the cooling system 1 according to FIG. 2 is shown in a second spatial view, wherein a bypass line 18 (only optionally provided) can be seen here. Apart from this, without exclusion of generalities, reference is made to FIG. 2 purely for clarity.

Via a first connection 19, the bypass line 18 is branched out (exclusively here) in the recirculation direction 32 in front of the (oil) filter 26 and behind the first heat exchanger 12. The bypass line 18 is fluidly connected to the second winding head region 11 via the second connector 20. The remaining lines (i.e., the first main line 14, the second main line 15 and the cooling grooves 13) are thus bridged and an immediate connection between the heat exchanger 12 and the second winding head region 11 is created and the second winding head region 11 is thus supplied with the coolant 5 with a lower temperature in the event of cooling, as if the second winding head region 11 is exclusively downstream of the second winding head region 11 (and optionally the AC housing 7) and the stator lamination pack 50 in the circulation direction 32.

Figure 4:
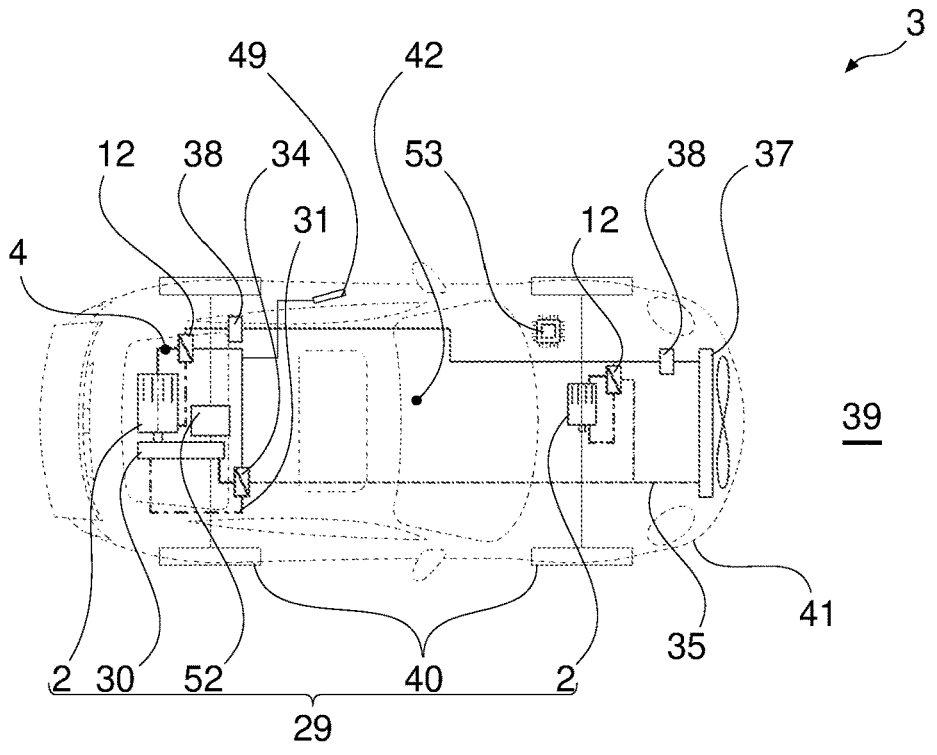
FIG. 4 illustrates a motor vehicle having a thermal management module in a schematic top view.

In FIG. 4, a motor vehicle 3 with a thermal management module 28 is shown in a schematic top plan view with a powertrain 29. The motor vehicle 3 comprises a transport compartment 42, for example a passenger compartment, approximately in the center of its chassis 41, and four propulsion wheels 40 to propel the motor vehicle 3 on and to the side of its chassis 41. In front, there is an electric traction machine 2 (optionally purely coaxial here) and behind, there is a further electric traction machine 2 (in this case optionally axially arranged), as well as behind, there is a transmission 30 and a differential 52, preferably wherein the differential 52 is integrated into the oil circuit 31. A pulse inverter 38 is provided for each of the front and rear electric traction machines 2. A water circuit 35 is configured for the temperature control of the pulse inverter 38 and the first heat exchangers 12 and the second heat exchanger 34, wherein the heat of the water circuit 35 can be dissipated to the environment 37 via a third heat exchanger 39 (shown here with a fan). The leading conduit is shown here with a solid line and the return line respectively as a dotted line so that the (third) circulation direction 36 of the water circuit 35 runs counter-clockwise in the illustration. Likewise, this is shown in the cooling system 1 on the electric traction machines 2 and in the oil circuit 31. For example, the cooling systems 1, the oil circuit 31, and the water circuit 35 are embodied as shown in FIGS. 2 and 3 as well as FIG. 1 (at least sectionally). Furthermore, a processor 53 is indicated here by means of which the necessary control and/or control of the shown (and possibly further) components can be implemented. The processor 53 is configured as a CPU, for example, and/or is part of an on-board computer of the motor vehicle 3. Here, optionally (for example in a carrier and/or rocker) a volume compensation tank 49 that is closed to the environment 39, for example, is provided.

With the first main line provided herein, an AC connector is incorporated into a cooling system for an electrical traction machine in a manner so as to be efficiently cooled.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Cooling system
2 Traction machine
3 Motor vehicle
4 Circuit system
5 First coolant
6 First circulation pump
7 AC housing
8 Motor inlet connection
9 Motor outlet connection
10 First winding head region
11 Second winding head region
12 First heat exchanger
13 Cooling groove
14 First main line
15 Second main line
16 First vent line
17 Second vent line
18 Bypass line
19 First bypass line connection
20 Second bypass line connection
21 Third bypass line connection

14

22 Earth gravity field
23 Highest point of the AC housing
24 Highest point of the first winding head region
25 Highest point of the second winding head region
26 Oil filter
27 Connecting line
28 Thermal management module
29 Drive train
30 Transmission
31 Oil circuit
32 First circulation direction
33 Second circulation direction
34 Second heat exchanger
35 Water circuit
36 Third circulation direction
37 Third heat exchanger
38 Pulse inverter
39 Environment
40 Drive wheel
41 Chassis
42 Transport chamber
43 Transmission component
44 Oil sump
45 Coarse filter
46 Second circulation pump
47 Compensation tank
48 Gas
49 Volume compensation tank
50 Stator lamination pack
51 Temperature sensor
52 Differential
53 Processor

The invention claimed is:

1. A cooling system for an electric traction machine for a motor vehicle, comprising:
   a circuit system for conducting a first coolant to be circulated;
   a first circulation pump for conveying the first coolant in the circuit system;
   an AC housing for an AC connection for the electric traction machine;
   a motor inlet connection for fluidly connecting the circuit system on an input side to the electric traction machine to be temperature-controlled;
   a motor outlet connection for fluidly connecting the circuit system on an output side to the electric traction machine to be temperature-controlled;
   a first heat exchanger for dissipating heat from and/or supplying heat to the first coolant to be circulated in the circuit system; and
   a first main line, by which the first heat exchanger and the AC housing are fluidly connected to one another.

2. The cooling system according to claim 1, wherein the first main line is connected to the AC housing at a highest point in a normal orientation of the AC housing in the earth gravity field.

3. The cooling system according to claim 2, wherein the highest point of the AC housing in the normal orientation is the same as or higher than at least one of the following components:
   the motor inlet connection,
   the motor outlet connection, and
   a different line section of the circuit system.

4. The cooling system according to claim 1, wherein the first main line is arranged upstream of a filter arranged behind the first heat exchanger.

5. The cooling system according to claim 1, wherein a first vent line is provided between the AC housing and one winding head region of the electric traction machine to be temperature-controlled.

6. The cooling system according to claim 5, wherein a first vent line is provided between the AC housing and a first winding head region of the electric traction machine to be temperature-controlled.

7. The cooling system according to claim 5, wherein a first vent line is indirectly or directly fluidly connected to at least one of the following highest points in the earth gravity field in a normal orientation of the cooling system:

with a highest point of the AC housing;

with a highest point of a first winding head region of the electric traction machine to be temperature-controlled; and with a highest point of a second winding head region of the electric traction machine to be temperature-controlled.

8. The cooling system according to claim 1, wherein a second vent line is provided, by which, in a normal orientation of the electrical traction machine in the earth gravity field, respective highest points of winding head regions of the electrical traction machine to be temperature-controlled are fluidly connected to one another.

9. A thermal management module for a powertrain of a motor vehicle, comprising:

for a transmission, an oil circuit having a second circulation direction and having a second heat exchanger;

for at least one vehicle component, a water circuit having a third circulation direction and having a third heat exchanger; and for the electric traction machine, the cooling system according to claim 1.

10. The thermal management module according to claim 9, wherein the water circuit is connected to the first heat exchanger of the cooling system for the electric traction machine for heat transfer, and wherein a pulse inverter for the electric traction machine is arranged upstream of the first heat exchanger.

11. The thermal management module according to claim 10, wherein the water circuit is additionally connected to the second heat exchanger of the oil circuit for heat transfer, and wherein the first heat exchanger is arranged upstream of the second heat exchanger.

12. The thermal management module according to claim 11, wherein the water circuit is additionally connected to the second heat exchanger as the only liquid-bonded heat transfer of the cooling system to an environment.

13. The thermal management module according to claim 11, wherein the first heat exchanger is arranged upstream of the second heat exchanger in the third circulation direction of the water circuit.

14. The thermal management module according to claim 10, wherein the water circuit is connected to the first heat exchanger as the only liquid-bonded heat transfer of the cooling system to an environment.

15. The thermal management module according to claim 10, wherein the pulse inverter is arranged upstream of the first heat exchanger in the third circulation direction of the water circuit.

16. The thermal management module according to claim 9, comprising a pulse inverter for the electric traction machine arranged in the water circuit.

17. A powertrain for a motor vehicle, comprising:

at least one electric traction machine for providing a torque;

at least one propulsion wheel for propelling the motor vehicle by the torque of the at least one electric traction machine;

at least one transmission for conducting the torque between the at least one electric traction machine and at least one of the at least one propulsion wheel; and the cooling system according to claim 1 for at least one of the at least one electric traction machine, at least one of the at least one transmission, and at least one vehicle component.

18. A motor vehicle comprising:

a chassis having a transport cell; and the powertrain according to claim 17 for driving the motor vehicle forward.

19. The powertrain according to claim 17, wherein the at least one vehicle component includes a pulse inverter for at least one of the at least one electric traction machine.

\* \* \* \* \*